United States Patent [19]

Galbato

[11] 3,709,570
[45] Jan. 9, 1973

[54] ANTI-FRICTION BEARING HOUSING
[75] Inventor: Anthony T. Galbato, Jamestown, N.Y.
[73] Assignee: TRW Inc., Cleveland, Ohio
[22] Filed: Dec. 28, 1970
[21] Appl. No.: 101,936

[52] U.S. Cl..................................308/26, 267/161
[51] Int. Cl..............................................F16c 35/06
[58] Field of Search........308/26; 267/161, 162, 163; 248/358 R, 358 AA, 21; 152/85

[56] References Cited

UNITED STATES PATENTS

| | | | |
|---|---|---|---|
| 2,557,610 | 6/1951 | Meyers et al. | 248/21 |
| 3,563,527 | 2/1971 | Tillman | 267/161 X |
| 1,035,410 | 8/1912 | Beydler | 152/85 |
| 2,504,776 | 4/1950 | Woodfield et al. | 308/26 |
| 2,494,815 | 1/1950 | Jadoul | 308/26 |
| 2,851,314 | 9/1958 | Thomson | 308/26 |
| 3,140,901 | 7/1964 | Young | 308/26 |
| 3,261,598 | 7/1966 | Jones | 267/163 |
| 2,202,630 | 5/1940 | Hauber | 267/90 |

FOREIGN PATENTS OR APPLICATIONS

| | | | |
|---|---|---|---|
| 177,641 | 8/1900 | Germany | 152/85 |
| 951,195 | 10/1956 | Germany | 267/162 |

Primary Examiner—Martin P. Schwadron
Assistant Examiner—Barry Grossman
Attorney—Hill, Sherman, Meroni, Gross & Simpson

[57] ABSTRACT

A resilient damper assembly for connecting an anti-friction bearing assembly to a housing, the resilient damper assembly consisting of three parallel radially spaced-apart lands, the outer land connected to the center land by a radially extending land at one end and the inner land connected to the center land by a radially extending land at the other end thereof, the center land having a plurality of radial slots therethrough to provide bending bars. In a second embodiment, the resilient land comprises a U-shaped cross section circumferentially around the bearing race assembly which is radially flexible.

13 Claims, 9 Drawing Figures

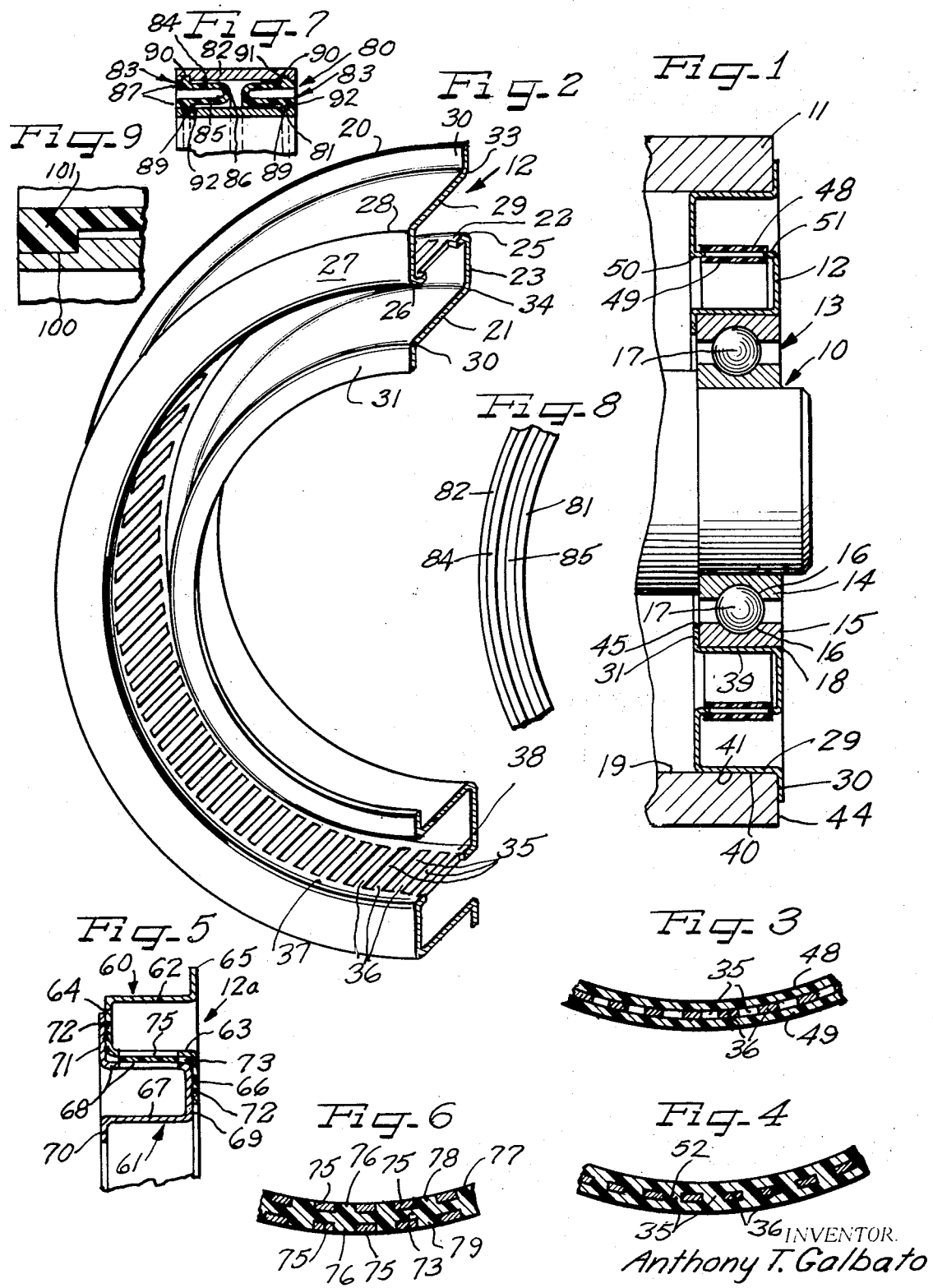

1

ANTI-FRICTION BEARING HOUSING

BACKGROUND OF THE INVENTION

1. Field of the Invention

This invention relates to bearing assemblies, and more particularly to a resilient dampening housing for a bearing assembly.

2. Prior Art

Bearing mount supports oftentimes have to be able to accommodate radial movement of the bearing to protect against vibration and shock forces which might otherwise damage the bearing assembly, or housing structure, or shaft. The provision of bearing mountings having elastic properties is known to the art. Further, in varying high-temperature applications, large thermal stresses are induced in the bearing unless the bearing assembly is mounted in a non-rigid structure which will allow thermal expansion of the assembly. It has been suggested to reduce shock forces and thermal stresses through the use of elastic bearing supports. However, such prior supports have normally involved compressive support systems either surrounding the bearing assembly with elastomer or with springs. In any instance, provision of a uniform support around the entire periphery of the bearing assembly has been difficult to achieve.

Further, especially in the case of eccentric shafts or variable loadings, vibration can build up to provide extreme throw-out at the bearing assembly. It is therefore desirable to provide a dampening characteristic to the elastic or resilient mounting.

SUMMARY OF THE INVENTION

The present invention provides an improved non-rigid mounting for a bearing assembly wherein the elasticity of the mounting is generated through bending of resilient beam sections. Further, the design provides for dampening characteristics through the use of viscoelastic material which absorbs part of the bending deflection of the beams.

In the preferred embodiment, the support is provided between the outer race of the bearing assembly and the housing and includes an axially extending land provided with a plurality of axial slots therethrough to define beams between the slots. The slotted land is attached to the housing at one end thereof and to the bearing assembly at the other end thereof through radially extending lands. Therefore, radical movement of the bearing assembly will create bending deflection in each of the beams of the slotted land. Elastic construction of the material of the slotted land allows the beams to bend to accommodate radial movement of the bearing assembly while at the same time providing a return force to return the assembly to its concentric positioning with the housing. Further, the provision of the slotted land allows accommodation of circumferential expansion of the bearing assembly due to thermal considerations.

Dampening characteristics can be provided by elastomer layering or bonding within the slotted land.

In a second embodiment, inner and outer concentric retaining rings are provided which are spaced apart by a pair of U-shaped cross section rings having their legs contacting the inner and outer rings with the bight section interposed therebetween whereby the legs of the "U" may flex towards and away from one another to accommodate movement of the race assembly.

It is therefore a primary object of this invention to provide an improved elastic support for a bearing assembly.

It is a definite object of this invention to provide an improved elastic support for a bearing assembly wherein the elasticity is generated through a bending of a member interposed between the outer race ring and the housing in which the assembly is received.

It is a further object of this invention to provide an elastic support for a bearing assembly wherein the elasticity is generated through a bending movement of circumferentially spaced beams.

It is another and further object of this invention to provide an elastic bearing support which interposes a slotted land between the bearing assembly and the housing with one end of the slotted land attached to the bearing assembly and the other end of the slotted land attached to the housing whereby radial movement of the bearing assembly will create bending of the land portions between the slots.

It is another specific object of this invention to provide an elastic bearing support for a bearing race assembly, the support having two concentric rings spaced apart and connected by a pair of U-shaped cross section viscoelastic members, each viscoelastic member having one leg contacting the outer ring and the other leg contacting the inner ring and being elastically deformable at the bight section.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 1 is a cross-sectional view of a bearing and shaft assembly received in a housing and supported by the bearing support of this invention.

FIG. 2 is a fragmentary perspective view of the bearing support of this invention.

FIG. 3 is a cross-sectional view of the central land of the bearing support of FIG. 1.

FIG. 4 is a view similar to FIG. 3, showing an alternative embodiment.

FIG. 5 is a fragmentary cross-sectional view of a modified bearing support according to this invention.

FIG. 6 is a cross-sectional view similar to FIG. 3 of the bearing support of FIG. 5.

FIG. 7 is a fragmentary cross-sectional view of a modified form of this invention.

FIG. 8 is a fragmentary side plan view of the modification of FIG. 7.

FIG. 9 is a fragmentary cross-sectional view of a modification of the embodiment of FIG. 7.

DESCRIPTION OF THE PREFERRED EMBODIMENTS

FIG. 1 is a cross-sectional view of a bearing shaft assembly 10 received in a housing 11. A bearing mounting support 12 is interposed between the bearing assembly 13 and the housing 11.

The bearing assembly 13 consists of an inner race ring 14 and an outer race ring 15 having opposed circumferential grooves 16 in which ride anti-friction bearing balls 17. The outer diameter 18 of the outer race 15 is spaced from the inner diameter 19 of the housing opening 11 by an amount sufficient to receive the bearing support 12.

The bearing support 12, best illustrated in FIG. 2, in a preferred embodiment, consists of a strip of bent metal 20 or other resilient material. The metal strip 20 is bent into an "S" cross-sectional configuration and is circumferentially continuous to form a ring. The inner diameter leg 21 comprising the bottom of the "S" has a diameter approximately equal to the outer diameter 18 of the outer race 15 and is received therearound. The center leg or cross-bar 22 of the "S" configuration is radially spaced outwardly from the inner diameter leg 21 and is connected thereto by a radial leg 23 integrally attached to an axial end 24 of the leg 21 and an axial end 25 of the center leg 22. The axial ends 24 and 25 are at the same ends of the concentric axially aligned legs 21 and 22 whereby the legs 21, 22 and the radial leg 23 form a U-shaped section with the leg 23 comprising the bight. The opposite end 26 of the central leg 22 is attached to a radially outwardly extending leg 27 which has its outermost end 28 attached to the outer diameter circumferential leg 29 which forms the top leg of the S-shaped cross section configuration support. The combination of the central leg 22, the radial leg 27 and the outermost leg 29 is again U-shaped, opening opposite the combination of the legs 21, 22 and 23 whereby the support is S-shaped in cross section. Outturned radially extending flanges 30 and 31 are provided at the free ends 32 and 33 of the legs 21 and 29. The flange 30 projects radially outwardly while the flange 31 projects radially inwardly.

The central cross land or leg 22 has a plurality of circumferentially spaced slots 35 therein. The slots are axially disposed, parallel and extend across the major axial portion of the land 22, defining beams 36 therebetween. The beams are integral with circumferentially continuous lands 37 and 38 at the axial ends of the slotted portions of the land 22. The provision of the beams and slots 35 and 36 weakens the center land 22 with respect to the lands 21, 23, 27 and 29. Due to the equal spacing of the slots 35 around the entire circumference of the land 22, the weakening is proportional. When the support 12 is positioned in the housing as illustrated in FIG. 1 with the outer diameter 18 of outer raceway fitted against the inner diameter 39 of the land 21 and the inner diameter 40 of the housing fitted against the outer diameter 41 of the land 29, the support will be able to accommodate radial movement of the bearing assembly 13. The flanges 30 and 31 overlap portions of the housing front radial wall 44 and the side wall 45 of the outer race ring. The outer race ring and the housing may be attached to the support in any desired manner, including press-fitting.

Because of the weakening of the land 22 through the provision of the slots 35, radial movement of the bearing assembly and shaft with respect to the housing is accommodated through a bending moment of the beams 36. Due to the resilient or spring nature of the material of the support 12, the support will always urge the bearing and shaft back to center position.

In order to prevent vibratory buildup of radial movement due to the springiness of the support 13, elastomer strips 48 and 49 are bonded to the inner diameter 50 and outer diameter 51 faces of the central land 22. The elastomer strips 48 and 49 are continuous around the circumference of the land 22 and provide for dampening of the spring action.

The elasticity or spring action is the sum of the bending deflections of each of the restrained beams along the center land 22 where such deflections result in pure bending stresses. The buildup of the spring action which can occur through continuous radial directional forcing as by means of shaft off-center loading is dampened by the elastomer through energy dissipation. The use of the elastomer can create energy dissipation as a function of the elastomeric materials loss factor and energy input due to its shear deformation from the bending of the beams. However, by using an elastomer or other viscoelastic material for the strips 48 and 49, the ability of the support to accommodate radial movement including thermal expansion is not restricted other than by the shear strength of the material.

FIG. 4 illustrates a further modification of the support of FIGS. 1 and 3 wherein the viscoelastic material 52 is provided as a continuous cover enveloping the beams 36 and bonded therearound whereby the slots 35 are filled with viscoelastic material.

FIG. 5 illustrates a further modification of the invention wherein the support 12a is constructed of two pieces 60 and 61 which are fastened together in abutting relation. Each of the pieces is substantially U-shaped with outturned flanges at the open end of the U in cross section. Thus, the piece 60 consists of legs 62 and 63 interconnected by a bight section 64 with outturned flanges 65 and 66 at the ends opposite the bight. The piece 61 consists of legs 67 and 68 interconnected through a bight section 69 with outturned flanges 70 and 71 at the ends of the legs opposite the bight. The two pieces 60 and 61 are assembled together with the flange 66 abutting the outside surface of the bight 69 and the flange 71 abutting the outside surface of the bight 64. The pieces may be attached as by welding at 72 or like methods.

Preferably, the pieces 60 and 61 are attached together with the legs 63 and 68 spaced from one another a short distance indicated at 73. The legs 63 and 68 are slotted in the same manner as the leg 22 of FIG. 2 to provide circumferentially spaced-apart axially extending beams 75 alternating with slots 76. The slots and beams are again dimensioned so that any radial shifting force of a bearing and shaft assembly received within the diameter of the legs 67 will result in a bending moment of the beams 75.

In order to provide dampening, as illustrated in FIG. 6, viscoelastic material 77 may be interposed between the beams 75 and slots 76 of the legs 63 and 68 and, as illustrated, may also include viscoelastic material in the space 73 between the beams 75 of the two legs. The viscoelastic material 77 may be pre-formed as a strip having opposed nibs 78 and 79 interfitting with the slots 76. Alternatively, the viscoelastic material may be applied in any other manner and is preferably bonded to the beams.

It will be understood that in all of the illustrated embodiments, radial expansion of the bearing assembly, as by thermal expansion, will be accommodated by equal bending of the beams entirely around the center leg. This will still allow radial movement as by shaft off-center loading.

FIGS. 7 through 9 illustrate a further modification of this invention wherein the possibility of circumferential and/or radial movement is accommodated through a bending moment in the bight area of two U-shaped cross-section elastomeric members.

As best illustrated in FIG. 7, the modified damper assembly 80 consists of an inner support or retaining ring 81 and an outer support or retaining ring 82 concentric with and spaced from the inner ring. The inner ring 81 is adapted to be received in contact with the outer race 15 of a bearing assembly. It is to be understood that although a separate ring 81 is illustrated, the ring could comprise a portion of the outer race. Interposed between the inner ring 81 and the outer ring 82 are a pair of resilient suspension members 83. The suspension members 83 are substantially U-shaped in cross section and are circumferential. The U-shaped cross section provides an outer leg 84 and an inner leg 85 concentric with one another with a bight section 86 joining them. The rings 83 are constructed of a material having sufficient stiffness to normally maintain the legs 84 and 85 in spaced-apart relation, yet with sufficient resiliency to allow a bending at the bight section 86 to urge the free ends 87 towards and away from one another during expansion or radial movement of the inner ring 81. The resilient nature of the material of the rings 83 should be such as to return them to an equalized position such as is illustrated. In the preferred embodiment illustrated in FIG. 7, circumferential opposed interior grooves 89 and 90 are provided in the opposed faces of the rings 81 and 82. The grooves receive radial projections 91 and 92 on the legs 84 and 85 of the rings 83 to maintain the U-shaped cross section rings between the support rings 81 and 82 while allowing the U-shaped cross section rings to transmit the spring motion thereof.

In a modified form of the invention illustrated in FIG. 9, the grooves are replaced by a ledge 100 which extends to the periphery of both of the support rings 81 and 82 and the radial projections 91 and 92 are replaced with a single radial projection 101 which extends to the ends of the U-shaped cross section rings. The rings may, if desired, be bonded in the grooves or ledge or attached thereto by other fastening means.

It will be noted that in the embodiment of FIGS. 7 through 9, the U-shaped cross section rings are normally positioned so that the major portion of the legs of the "U" are parallel to the axis of the shaft supported by the bearing assembly. This parallelism will be distorted during radial or circumferential movement of the assembly with respect to the housing in which it is received. In connection with this embodiment, it will be appreciated that normally the U-shaped cross section rings should be constructed with a resiliency which tends to open them towards a wider opened "U" and that the rings may be installed in a compressed state.

Although I have herein set forth my invention with respect to certain specific principles and details thereof, it will be understood that these may be varied without departing from the spirit and scope of the invention as set forth in the hereunto appended claims.

I claim as my invention:

1. A support for anti-friction bearing assemblies mounted in a housing which comprises a circular member interposed between a circular bearing assembly and a housing receiving the bearing assembly, said member including a circumferential land radially spaced from the assembly and encircling the assembly having a plurality of slots therethrough defining beams between the slots, the said beams being bendable and elastic and the said support accommodating radial movement of the bearing assembly with respect to the housing through a bending moment of the beams.

2. The support of claim 1 wherein viscoelastic material is bonded to the said beams to dampen radial movements which may otherwise build up due to the resilient nature of the support.

3. A support for an anti-friction bearing assembly received in a housing which comprises a 360° circumferential land spaced intermediate a housing and a bearing assembly, the said land being axially extending, one end of the said land operatively attached to the said bearing assembly, the other end of the said land operatively attached to the said housing, the said land having a plurality of axial slots therethrough defining axial beams therebetween, the said support accommodating radial movement of the bearing assembly with respect to the said housing through bending of the beams, and the said beams being constructed of a spring material to urge the said bearing assembly to a center position with respect to the said support.

4. The support of claim 3 wherein strips of viscoelastic material are bonded to either side of the said land.

5. The support of claim 3 wherein viscoelastic material is bonded to the said land circumferentially therearound with portions of the said viscoelastic material filling the spaces of the slots.

6. The support of claim 3 wherein two lands are provided.

7. The support of claim 6 wherein the said two lands are radially spaced.

8. The support of claim 7 wherein viscoelastic material is bonded to the said lands.

9. The support of claim 8 wherein the said viscoelastic material fills the space between the two lands.

10. The support of claim 9 wherein the viscoelastic material fills the space between the beams.

11. A resilient support for bearing assemblies received in a housing comprising a support member having a substantially S-shaped cross section with three concentric radially spaced-apart axially extending ring lands, the center land attached to the outer land at one axial end thereof and attached to the inner land at the other axial end thereof, the said center land having a plurality of circumferentially spaced-apart axial slots therein defining beams therebetween, the said beams constructed of a spring material, a bearing assembly received within the inner land, said support accommodating radial movement of a bearing assembly received within the diameter of the inner land through bending of the said beams, a housing having an opening and the said outer diameter land received in the opening in the said housing.

12. The support of claim 11 wherein viscoelastic material is bonded to the said support to dampen radial movement accommodated by the spring nature of the beams.

13. The support of claim 11 wherein the said support is constructed of one piece of material.

* * * * *